May 5, 1936.  F. L. MOSELEY  2,040,014
ANTIHUNTING POSITIONAL CONTROL
Filed July 3, 1934  2 Sheets-Sheet 1

INVENTOR
FRANCIS L. MOSELEY
BY
Herbert H. Thompson
HIS ATTORNEY.

May 5, 1936.  F. L. MOSELEY  2,040,014
ANTIHUNTING POSITIONAL CONTROL
Filed July 3, 1934  2 Sheets-Sheet 2

INVENTOR
FRANCIS L. MOSELEY
BY
Herbert H. Thompson
HIS ATTORNEY.

Patented May 5, 1936

2,040,014

UNITED STATES PATENT OFFICE 2,040,014

ANTIHUNTING POSITIONAL CONTROL

Francis L. Moseley, Brooklyn, N. Y., assignor to Sperry Gyroscope Company, Inc., Brooklyn, N. Y., a corporation of New York Application July 3, 1934, Serial No. 733,611

10 Claims. (Cl. 172—239)

This invention relates to the remote control of heavy objects, such as guns, searchlights, or ships' rudders, from a controlling object having small power, such as a hand operated controller or a sensitive instrument. A heavy object such as indicated above has ponderable inertia and when driven by a reversible power motor is subject to hunting around its normal position of rest. The control is also often jerky due to the fact that the motor is first lagging behind, then catching up with the controller and then overrunning the controller position. One of the causes of these troubles is that the torque exerted by the motor is usually proportional to the displacement between the controlling device and the controlled element, so that when the controlling element first starts to move a lag will occur before the motor starts, and after it starts it will increase in speed and rapidly overtake the controlling element, overshooting the position of zero torque. Unless artificially restrained, the motion of the controlled element will be oscillatory about the true correspondence position. According to my invention I propose to give the motor a large starting torque as soon as a signal is received, and to materially decrease the torque after the motor has started, so that the motor is slowed down before or by the time the controlling and controlled objects are in synchronism, thus preventing overrunning and consequent jerking and hunting.

Referring to the drawings.

Figure 1:
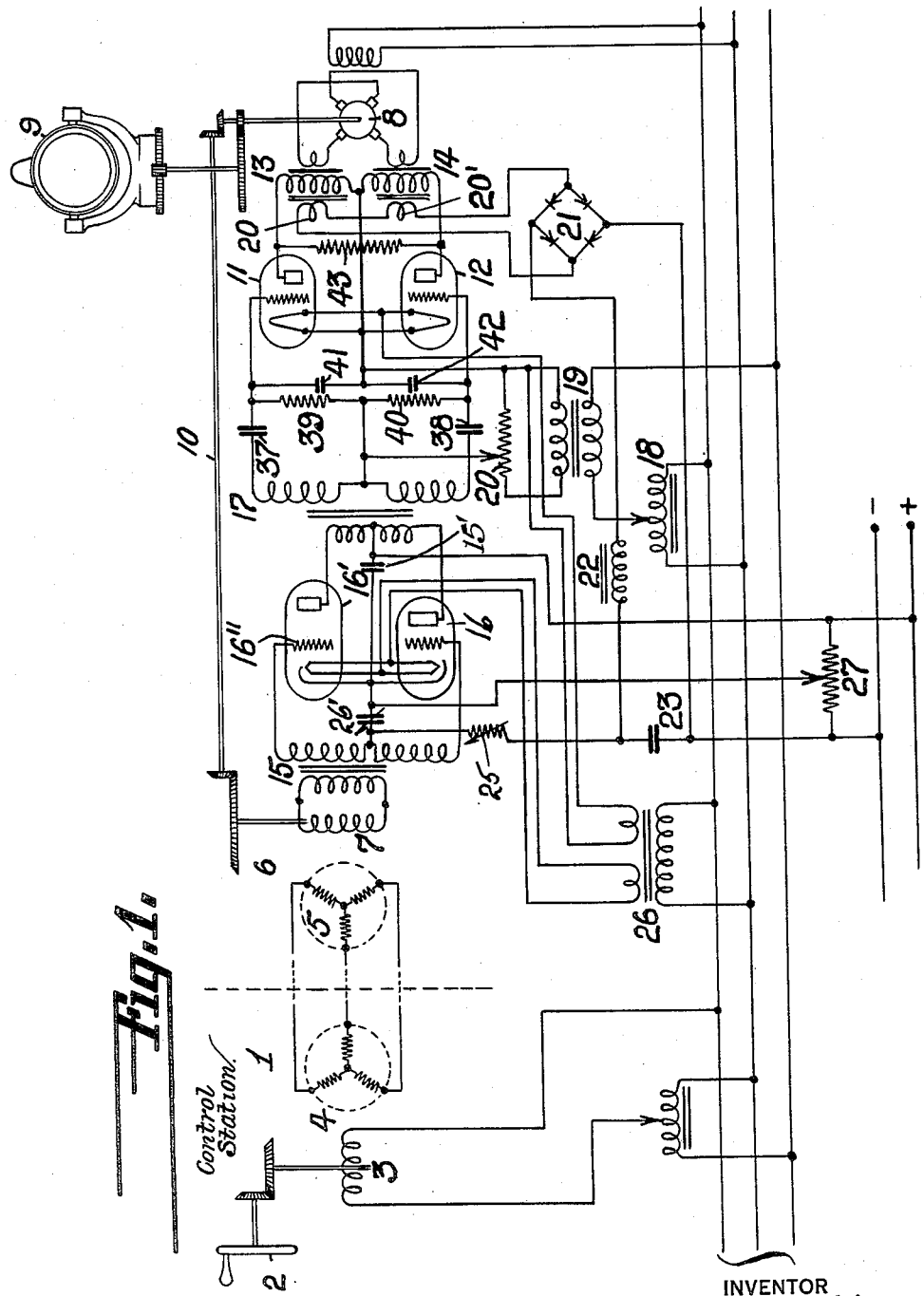
Fig. 1 is a wiring diagram showing my invention applied to one type of control circuit.

In Fig. 1 the control station is indicated at 1, wherein the handwheel 2 is shown as turning the armature 3 of a transformer 4, which is preferably of the inductive self-synchronous type. According to this system the single winding 3 is continuously excited from one phase of an A. C. source and the multi-wound stator is connected to the stator 5 of the receiving inductive device 6. The output of the single phase winding 7 of said motor will obviously vary in magnitude and polarity with the relative displacement between the sending and receiving armatures, and this signal is utilized to control the direction and torque of a power motor 8 for turning the searchlight or other object 9, a follow back connection 10 being shown from the motor 8 to the armature 7.

A suitable thermionic amplification control circuit is placed between the signal and the motor. This circuit and motor may assume a variety of forms, but I have illustrated in Figs. 1 and 2 a circuit and motor similar to that described and claimed in my copending application for Remote control of heavy objects, now Patent No. 2,008,364, dated July 16, 1935, although my invention may be applied to other types of thermionic control circuits. According to this system the motor 8 is of the repulsion type and is provided with two pairs of brushes so that it may be driven in either direction. The control of the motor is effected through electron tubes 11 and 12, which are preferably of the grid glow type and the plates of which are connected to transformers 13 and 14, which serve to reflect the tube impedance to the brush circuit, the tubes acting somewhat as variable resistances across the secondaries of the transformers.

The signal voltage induced in winding 7 is preferably amplified by transformer 15 and by one or more thermionic vacuum tubes 16 and 16', the grids of which are connected to the secondary of transformer 15. The anodes of tubes 16 and 16' are respectively connected to the ends of the primary winding of a transformer 17, the mid tap of which winding is connected to a constant potential source. A condenser 15' is connected between the mid tap of the primary winding of transformer 17 and the cathodes of tubes 16 and 16' for by-passing alternating current. The output of tubes 16 and 16' is coupled to the grids of the aforesaid control rectifier tubes 11 and 12 through the double, oppositely wound transformer 17 in such a way as to give a smooth and progressive phase shift control thereto, partly as outlined in my copending application No. 679,589, filed July 8, 1933. In this instance the out of phase addition voltage is shown as obtained from another phase of the supply through tapped inductance 18, transformer 19 and resistance 20 tapped to the mid point of dividing transformer 17. Condensers 37, 38 serve as blocking condensers to keep the grid current from flowing in the secondaries of transformer 17. Said D. C. currents are passed to the cathode through resistances 39, 40 and the A. C. bias circuit. Condensers 41, 42 are connected between the grids and cathodes of grid glow tubes 11, 12 to prevent transient plate voltage surges acting through plate, grid interelectrode capacity from affecting the grid. Resistor 43 is connected between he plates of tubes 11, 12, to further eliminate transient firing. This resistor operates as follows: When, for example, tube 11 is rendered fully conducting, it furnishes a low resistance path between its plate and cathode, and hence in effect serves to transfer one end of resistor 43 to the common cathode point of tubes 11, 12. The other end of resistor 43 is connected to the plate of tube 12, and hence when either tube is conductive, resistor 43 is transferred as a shunt to the transformer supplying the plate of the other tube, functioning as a bypass path for commutation or other transients present in the inactive tube circuit. Transient and erratic firing of the inactive tube is thus prevented and an extremely smooth and progressive control of the motor 8 becomes possible.

The heater circuits are shown as supplied from a multi-wound transformer 26 and the field of the repulsion motor is shown as excited from the same A. C. supply that supplies the control station. A constant negative bias on the grids is shown as supplied from a D. C. source through a variable resistance 27.

The circuit so far described is subject to the surging and hunting action above described. For preventing this action I prefer to introduce a secondary or feed back circuit for rendering the main amplification circuit less sensitive after the motor has started. To this end I have shown an extra secondary 20 and 20' on each of the transformers 13 and 14, the output of which is led through a rectifier circuit 21 which may be of the copper oxide full wave type. The output of the rectifier may be smoothed out by known means, such as choke coil 22 and condenser 23. The direct current output therefrom is used to furnish a variable negative bias on the grids 16" of tubes 16 and 16' so as to alter the normal D. C. bias thereon from the D. C. source through resistance 27, thereby decreasing the sensitivity thereof. With this arrangement the normal D. C. negative bias on the grids of tubes 16, 16' may normally be made so that these tubes have maximum amplification when first operated, so that the motor will receive full torque at that time. As soon, however, as the delayed direct current from the feed back circuit is received by the grids, the bias is altered to decrease the sensitivity, and hence the gain of the amplifier stage.

It is, of course, desirable that there be a time lag between the time that the motor starts and the time that the desensitizing bias is applied. For this purpose I have shown a variable resistance 25 in series between the rectifier 21 and the grid circuit of tubes 16 and 16' and a variable condenser 26' across the grid cathode circuit. With this or a similar arrangement, the extra negative charge from the rectifier 21 is delayed until the condenser 26' is charged, and by adjusting the condenser and resistance the amount of delay may be varied to suit the other factors in the system.

The circuit shown in Fig. 1 employs a push pull or balanced amplifier stage (tubes 16 and 16' and transformer 17) preceding the control rectifier circuit. This form of circuit has a great advantage over a single tube amplifier as it balances out the effects of rapid plate current changes acting through the transformer 17, which otherwise would cause erratic operation of the motor. It is obvious that an unbalanced or single amplifier stage could be substituted for the push pull tubes 16 and 16', at the possible sacrifice of some smoothness of operation.

Figure 2:
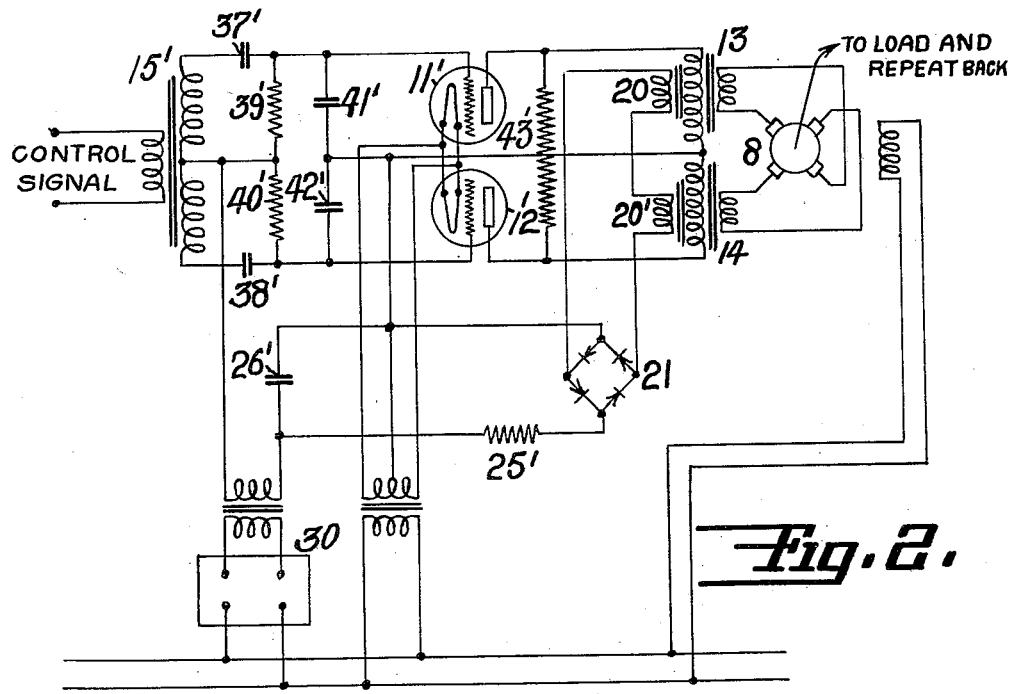
Fig. 2 shows a modified form of circuit.

Fig. 2 shows a somewhat different form of the invention, in which the vacuum tubes 16 and 16' are eliminated. In this figure only the electrical circuits are shown beyond the input from the signal, which in Fig. 1 is supplied to a transformer by the winding 7. In this case the input transformer 15' is of the divider type so as to apply opposite phases to the grids of the grid glow tubes 11' and 12'. The phase on the grids however, is oppositely shifted by combining the signal inputs with a bias A. C. voltage, as outlined in my prior application Serial No. 679,589 filed July 8, 1933. Said A. C. bias may be obtained from a phase corrector 30 of any suitable type and is combined with the signal voltage supplied to the grids from the transformer 15. As in Fig. 1, the direct current voltage is obtained from rectifier 21 coupled to extra coils 20 and 20' on transformers 13 and 14. In this case however, the rectified D. C. is applied as an addition to said A. C. bias or phase shifting bias normally supplied to the grids. The D. C. voltage from 21 is connected to said A. C. bias connection preferably through a delayed action resistance 25' and condenser 26' so that the sensitivity or response of the grid glow tubes is diminished a predetermined period after the motor has started, to effect the same purpose as in the main form of the invention.

Figure 3:
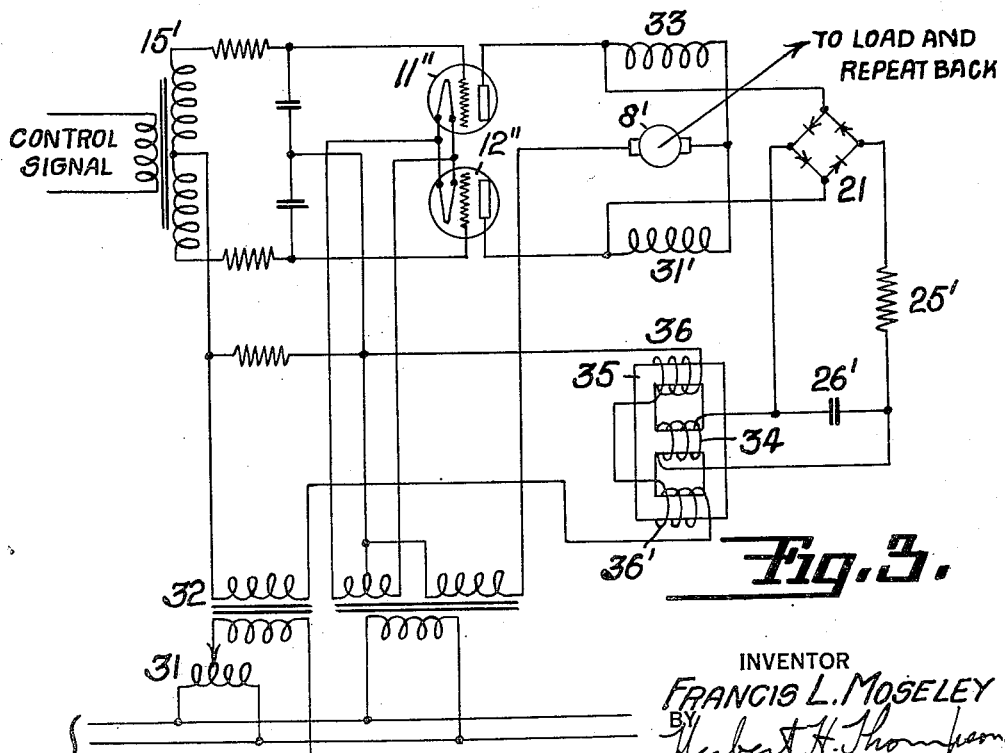
Fig. 3 shows still another form of circuit.

Fig. 3 shows a still further modification of my invention, simplified in the same manner as Fig. 2. According to this form the A. C. phase bias addition voltage is automatically adjusted to reduce the sensitivity of the tubes after the motor has started. In this case said addition voltage is shown as obtained through tapped coil 31 and transformer 32. In this case, also, the power motor 8' is shown as of the conventional D. C. type in which opposing field windings 33 and 33' are excited by the output of the tubes 11" and 12" so that as long as the outputs of said tubes are equal, the motor stands still, but is driven in one direction or the other by the preponderance of output of one tube or the other. The rectifier 21 is shown as connected across the tube outputs and serves to excite the winding 34 on a saturable reaction 35 through delayed action resistor 25' and condenser 26'. In this case the A. C. bias voltage supply is led through or otherwise coupled to windings 36 and 36' on said reactor, so that the magnitude of the A. C. bias voltage will be increased as the current through rectifier 21 increases, thereby increasing the phase angle through which the phase on the grids is displaced, and thereby decreasing the differential output of the tubes after a change in said output takes place.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a positional control for heavy objects having means for producing and receiving a signal, a reversible power motor for driving the object, a thermionic tube circuit for controlling said motor as to torque and direction in accordance with the strength and direction of the received signal, and feed back means for producing a D. C. feed back in said circuit for rendering said circuit less sensitive after said motor has started.

2. In a positional control for heavy objects having means for producing and receiving a signal, a reversible power motor for driving the object, a thermionic tube circuit for controlling said motor as to torque and direction in accordance with the strength and direction of the received signal, said circuit including a first stage amplifier tube having a grid, and feed back means for producing a D. C. feed back in said circuit to said grid for reducing the amplification factor of said tube after said motor has started.

3. In a positional control for heavy objects having means for producing and receiving a signal, a reversible power motor for driving the object, a thermionic tube circuit for controlling said motor as to torque and direction in accordance with the strength and direction of the received signal, feed back means in said circuit for rendering said circuit less sensitive, and delayed action means in said feed back means to cause a large starting but decreasing subsequent torque by said motor.

4. In a positional control for heavy objects having means for producing and receiving a signal, a reversible power motor for driving the object, a grid glow tube circuit which otherwise controls said motor as to torque and direction in accordance with the strength and polarity of the received signal including means for producing a phase displaced A. C. addition voltage for combining with said signal to shift the phase on the grids of the tubes, and delayed action means for adding a D. C. bias to said A. C. addition voltage for desensitizing said circuit after the motor has started.

5. In a positional control for heavy objects having means for producing and receiving a signal, a reversible power motor for driving the object, a grid glow tube circuit which otherwise controls said motor as to torque and direction in accordance with the strength and polarity of the received signal including phase changing means for producing a phase displaced A. C. addition voltage for combining with said signal to shift the phase on the grids of the tubes, means responsive to the current supplied to said motor for increasing the magnitude of said addition voltage, and delayed action means for preventing said increasing means from acting until said motor has had time to start.

6. In a positional control for heavy objects having means for producing and receiving a signal, a reversible power motor for driving the object, a pair of grid glow tubes, means for oppositely shifting the phase on the grids thereof on changes in the received signal, transformer windings connected to the outputs of said tubes for controlling said motor, and a resistor connected across said tube outputs to eliminate transient and erratic firing thereof.

7. Means for rotating an object requiring a comparatively large torque from a controller of small torque comprising a repulsion motor for the driven object having its field excited from an A. C. supply and two sets of reversing brushes, means including electron tubes and transformers in the anode circuits of said tubes for governing the amount of current flowing between the different pairs of brushes of said motor by varying the effective impedance therebetween, means responsive to relative angular movements of said controller and driven object for oppositely controlling the grids of said tubes to vary their resistances, and a resistor connected in shunt between said tubes and transformers to prevent transient and erratic firing thereof.

8. In a positional control for heavy objects having means for producing and receiving a signal, a reversible power motor for driving the object, a thermionic tube circuit for controlling said motor as to torque and direction in accordance with the strength and direction of the received signal, said tube circuit having coupling transformers therein arranged in circuit with an out of phase A. C. bias voltage, said tube circuit having series capacity and shunt resistances therein connected to said coupling transformers for elimination of the grid currents from the secondaries of said transformers.

9. In a positional control for heavy objects having means for producing and receiving a signal, a reversible power motor for driving the object, a thermionic tube circuit for controlling said motor as to torque and direction in accordance with the strength and direction of the received signal, said circuit including a pair of amplifier tubes, arranged in pull push fashion, and feed back means for producing a D. C. feed back in said circuit for reducing the amplification factor of said tubes commencing a predetermined time after the motor has started.

10. In a positional control for heavy objects having means for producing and receiving a signal, a reversible power motor for driving the object, a thermionic tube circuit for controlling said motor as to torque and direction in accordance with the strength and direction of the received signal, and feed back means in said circuit for rendering said circuit less sensitive after said motor has started, said circuit having means for preventing retransmission into the output of the disturbing effects of rapid plate current changes.

FRANCIS L. MOSELEY.